United States Patent [19]
Hinds et al.

[11] Patent Number: 5,880,541
[45] Date of Patent: Mar. 9, 1999

[54] SENSING AND CONTROLLING THE LOCATION OF ELEMENTS OF A LINEAR MOTOR

[75] Inventors: Walter E. Hinds, Beverly Hills; Martyn Lewis, Los Angeles, both of Calif.

[73] Assignee: Northern Magnetics, Inc., Santa Clarita, Calif.

[21] Appl. No.: 878,614

[22] Filed: Jun. 19, 1997

[51] Int. Cl.$^6$ .................................................. H02K 41/00
[52] U.S. Cl. ............................................................ 310/12
[58] Field of Search ............................. 310/12, 13, 14; 318/135, 685, 687, 696

[56] References Cited

U.S. PATENT DOCUMENTS

| | | | |
|---|---|---|---|
| 2,875,524 | 7/1959 | Bower et al. | 33/708 |
| 2,905,874 | 10/1959 | Kelling | 318/592 |
| 3,376,578 | 4/1968 | Sawyer | 318/135 |
| 4,137,491 | 1/1979 | Bartley et al. | 318/685 |
| 4,985,669 | 1/1991 | Smith | 318/685 |
| 5,179,304 | 1/1993 | Kenjo et al. | 310/12 |
| 5,606,206 | 2/1997 | Stephany et al. | 310/13 |
| 5,663,624 | 9/1997 | Callaway | 318/696 |
| 5,677,605 | 10/1997 | Cambier et al. | 318/254 |

Primary Examiner—Nestor Ramirez
Assistant Examiner—Judson H. Jones
Attorney, Agent, or Firm—Merchant, Gould, Smith, Edell, Welter & Schmidt

[57] ABSTRACT

A system for detecting movement of a forcer of a motor directed for effecting movement of a forcer in a first direction in response to command pulses. There is a toothed platen for locating the forcer so that the forcer is movable over the platen. A magnetic structure is attached to move with the forcer and has a periodic configuration corresponding to the forcer and in magnetic interchange relation to the platen. A magnetic circuit is associated with the magnetic structure. Flux sensors generate signal variations corresponding to flux variations as the forcer moves relative to the teeth of the platen. The signal variations provide step count signals, and the step count signals are compared to the command pulses to detect a disparity.

11 Claims, 6 Drawing Sheets

SENSING AND CONTROLLING THE LOCATION OF ELEMENTS OF A LINEAR MOTOR

BACKGROUND

Being able to sense the position and location of one or more elements of a linear motor moving on a platen is important. This invention relates to sensing the location of elements which move on a base in an open loop fashion. Certain linear stepper motors do not have a closed loop operation so there is no feedback to indicate whether the moving element has reached or overshot its destination. This can create significant problems when the moving element is wrongly positioned and work is to be performed on the workpiece associated with the moving element.

There is accordingly a need to have apparatus and a method for minimizing this problem. This invention is directed to solving this difficulty and providing apparatus and a method of sensing and controlling the location of the moving portion of a linear motor over a platen.

SUMMARY

The invention is directed to detecting movement, and also detecting the direction of movement of an open loop movable element.

The invention provides a device and method for determining whether an incrementing forcer has stepped the proper number of steps required by command pulses provided to the motor forcer. The forcer is a periodic device for incrementally moving in a normally open loop configuration over a toothed base element or platen, and can be a linear or other stepper motor system.

A magnetic structure that is attached to move with the forcer has a periodic configuration corresponding to the forcer and in magnetic interchange relation to the platen.

A magnetic circuit means associated with the magnetic structure includes flux sensors generating signal variations corresponding to flux variations as the forcer moves relative to the teeth of the platen. There are means for digitizing the signal variations to provide step count signals; and means for comparing the step count signals to the command pulses to detect a disparity.

Further according to the invention the platen and forcer comprise a linear motor. The magnetic circuit means has teeth with a pitch matching the forcer and Hall effect sensors with a pitch matching the platen.

Also according to the invention the flux sensors include quadrature means for generating signals to indicate step movement and direction, and there are means for comparing comprising an up/down counter.

There is provided a unit for attachment to the forcer of the linear motor and for interaction magnetically with the platen. Hall effect devices are effectively part of or are attached to the forcer and act as one or more sensors to sense changes in flux as the forcer and the attached sensor are moved over the platen. The sensor has teeth with a pitch substantially approximating that of the forcer.

The flux from an in-circuit permanent magnet is varied as the relative movement between opposed teeth of sensor and platen changes. This is caused to vary in a substantially sine-wave fashion.

After each move, a controller compares the signal output from the sensor to the commanded move signal from the driver. If there is no difference, it is assumed that the forcer has successfully completed its move. If there is a difference between the 2 signals then:

a) a light can be turned to alert operator of a problem. The system can then be shut down; or b) the position can be corrected by moving the forcer to bring the error signal to zero.

The invention is further described with reference to the accompanying drawings.

DRAWINGS

FIG. 1 is a perspective view of the linear motor system and controls, showing the forcer or primary, a secondary or platen. There is a small sensor attached to and made movable with the forcer.

FIG. 2 is a side view arrangement showing in block diagram form the relationship of the major circuit elements with the forcer, toothed platen and sensor circuit components. The diagram shows the specific disposition of the Hall effect sensors on the forcer. The major circuit components include command, control, power and indicator circuits.

DESCRIPTION

Figure 1:
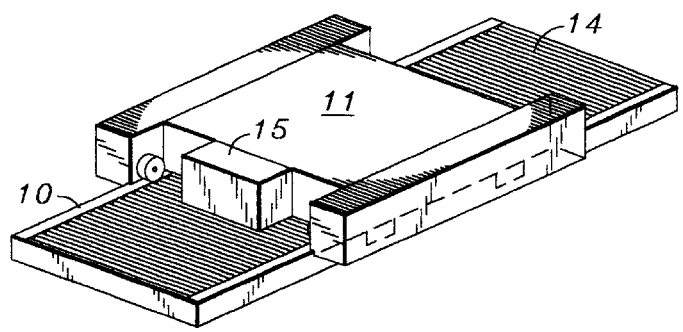

A stepper linear motor includes a platen 10 and forcer 11. A magnetic circuit means has teeth with a pitch substantially approximating the pitch of the forcer. A linear stepper motor comes in two types; single or dual axis. The single axis version is illustrated in FIG. 1. The single Axis Linear Stepper Motors are ideal for open loop positioning applications that require speeds to 100 inches per second, relatively low forces from 2 to 50 pounds and positional repeatabilities not exceeding 0.00008 inches. They are very simple to use and implement into a system as they do not require any servo tuning.

A single axis linear stepper motor is a short moving primary that contains the electrically powered coils moves down the length of the long stationary secondary.

The primary 11 of the single axis stepper motor is similar to the stator of a rotary stepper motor with the primary containing the permanent magnets. It consists of steel motor laminations with 0.010 or 0.020" teeth cut in them, two or more coils, and one or more rare earth permanent magnets, all contained in an aluminum housing. The teeth 12 are cut in the surface of the primary lamination in such a way to allow the motor to move when driven by a two (or four) phase stepper motor driver.

An arrangement of Hall effect sensors 13 has a pitch substantially approximating the pitch of the platen teeth 14.

The sensors 13 are arranged as a unit 15 for attachment to the forcer of the linear motor and for interaction magnetically with the platen 10. Hall effect devices $S_1$ and $S_2$ are effectively part of or are attached to the forcer 11 and act as one or more sensors to sense changes in flux as the forcer and the attached sensor are moved over the platen. The theory of Hall effect sensors to indicate flux variations which indicate tooth passage is well known. The sensors 13 have teeth 16 with a pitch like that of the forcer 11.

The forcer 11, which is an incrementing forcer, normally steps the proper number of steps required by command pulses provided to the motor forcer. The forcer 11 is a device for moving in a normally open loop configuration over a base element such as the platen.

A magnetic circuit means is attached to the forcer and has a periodic configuration corresponding to the forcer and is in magnetic interchange relation to the platen 10. The magnetic circuit means includes flux sensors generating signal variations corresponding to flux variations as the forcer 11 moves relative to the platen 10.

There are means for digitizing the signal variations to provide step count signals; and means for comparing the step count signals to the command pulses to detect a disparity.

The flux sensors generate signals to indicate step movement and direction, and a digital comparator compares the contents of an up/down counter with the contents of a step command counter. The flux from an in-circuit permanent magnet is varied as the relative movement between opposed teeth of sensor and platen changes.

The pitch of the platen 10, which in some instances is regarded as the secondary, is 0.040 inches. This is a standard with some linear motors. The full step increments of the forcer, which in some instances is regarded as the primary, is ¼ of the pitch, namely 0.010 inch. There are circuit arrangements which make steppers able to function in fractional steps for higher resolution positioning.

Figure 2:
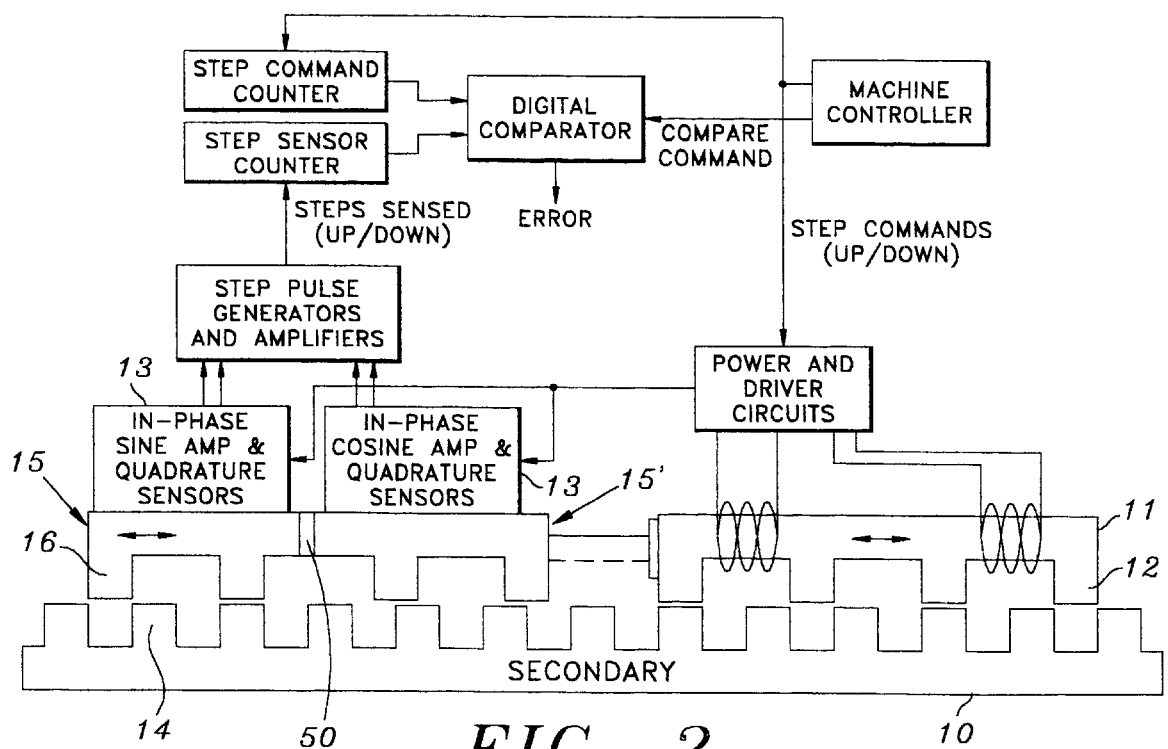

FIG. 2 shows the flux paths through the sensor. The relationship and attachment to the forcer are also shown. There is a permanent magnet 50 in the center of the sensor 13 which generates the magnetic field whose variations are detected as movement of the forcer 11 and sensor 13 takes place. The two sensors, are actually pairs of sensors, to establish quadrature related signals used so that direction can be sensed. This is shown in the input sine waves of FIG. 3. In some other forms of the invention it is possible to generate higher resolution signals than the basic resolution of 0.010" per step for the sensor, by use of known interpolating circuits.

Figure 4A:
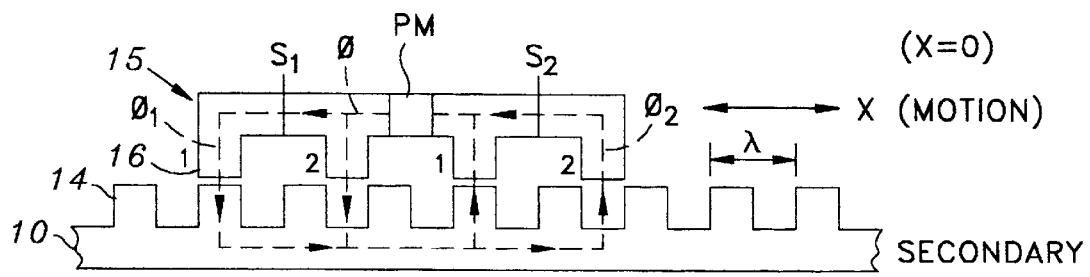
FIGS. 4A and 4B are flux diagrams for two-hole sensors which are part of a sensor element 15 mounted in relation to a secondary element.
Figure 4B:
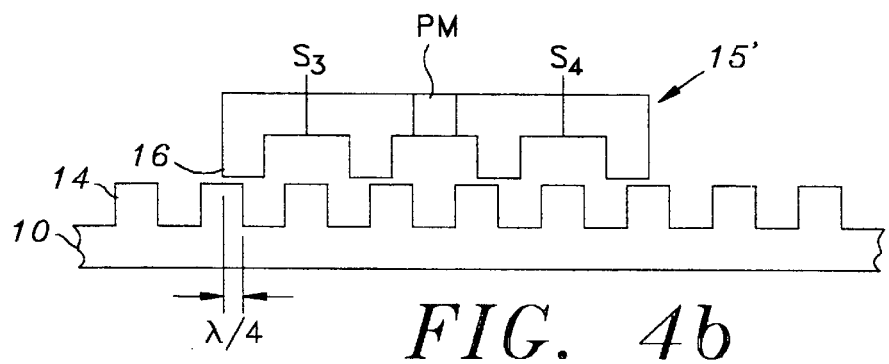
Figure 5:
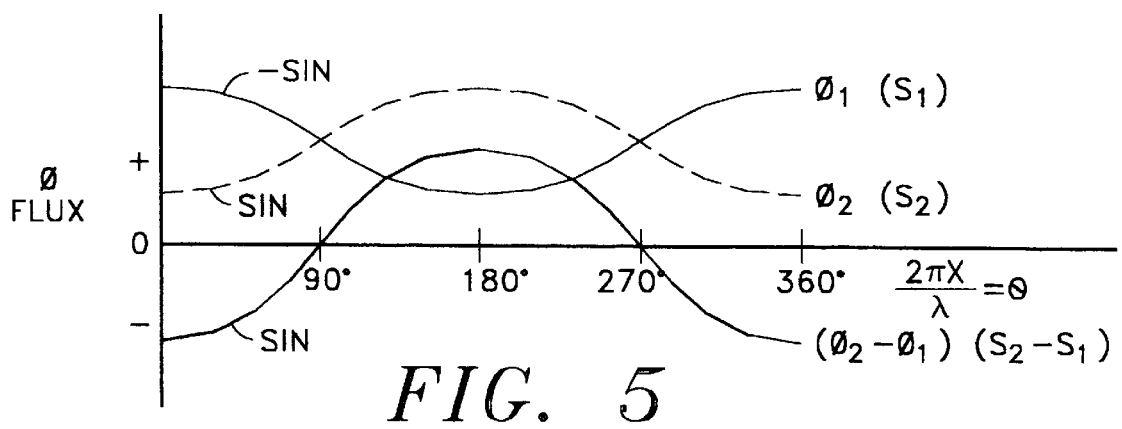
FIG. 5 is a sinewave representation of the flux signals obtained from the two sensors, $S_1$ and $S_2$ and an illustration of the net result of those signals.
Figure 6:
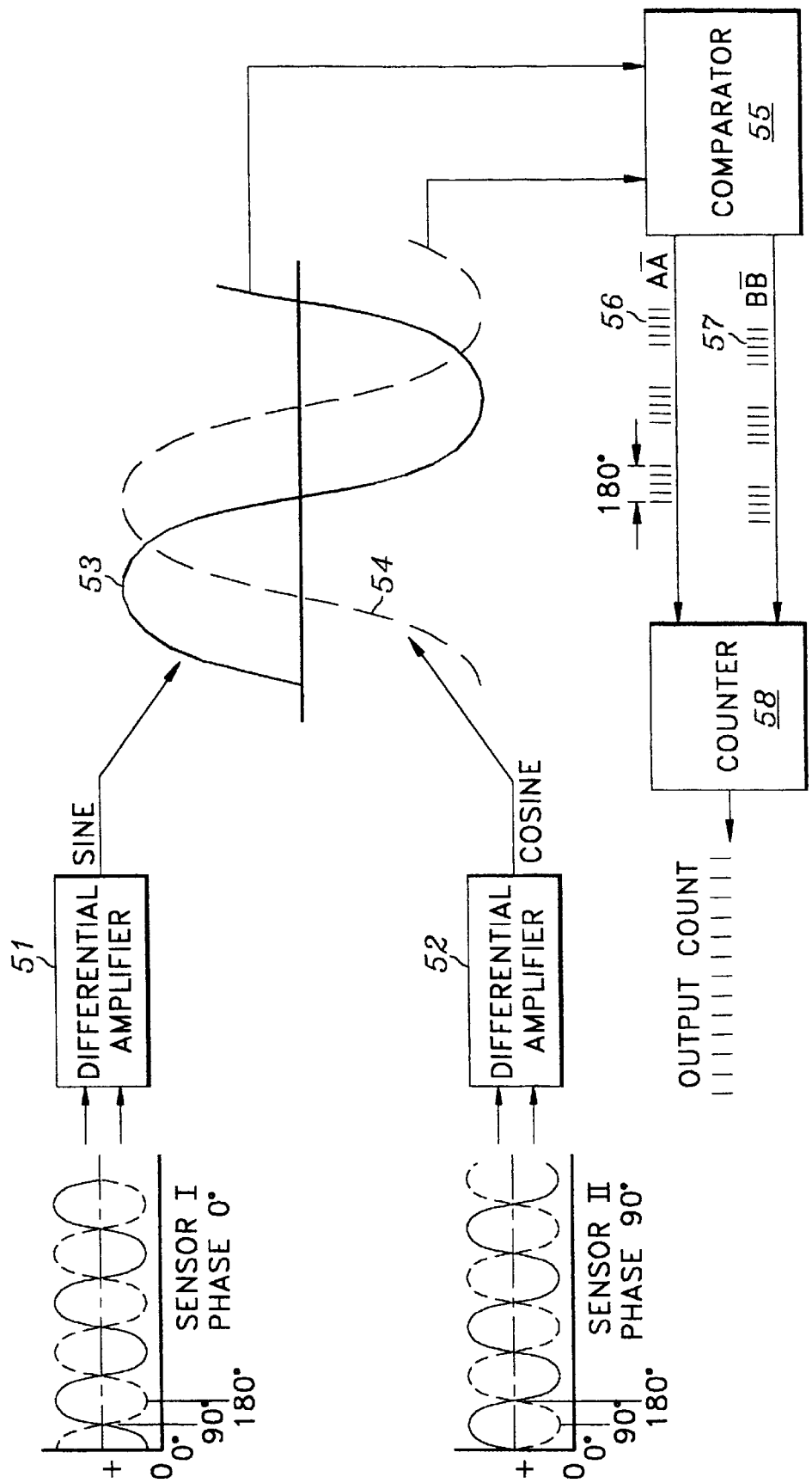
FIG. 6 is a block diagram representation of the signals obtained from each of two sensors, through differential amplifiers, comparators and a counter.

In FIG. 4A there is illustrated a flux path relationship (sine wave) between a secondary element 10 and a sensor 15 whereas FIG. 4B illustrates a flux path relationship for cosine wave. Within the sensor 15 there are two Hall effect sensors, $S_1$ and $S_2$ spaced apart and between those sensors there is a Permanent Magnet. The sensor 15 has teeth 16 which have a pitch different to the teeth 14 of the secondary element. Different flux paths $\phi 1$ and $\phi 2$ are established between the teeth 14 and 16 and through the air gaps between the teeth 14 and the teeth 16 as indicated by the phantom of lines which are arrowed in FIG. 4A. The total flux passes adjacent to either side of the Permanent Magnet is indicated as $\phi$. Since $S_1$ has flux $\phi_1$ passing through the sensor $S_1$ and sensor $S_2$ has flux $\phi_2$ passing through it, the flux $\phi$ varies as sensed by each of the sensors $S_1$ and $S_2$ as shown in FIG. 5. The relationship of location between sensors $S_1$ and $S_2$ and as determined by the spacing between teeth 1 and 2 of the sensor 15 and the pitch between teeth 1 and 2 relative to the pitch between teeth 14 creates a flux pattern $S_1$ and $S_2$ which are 180° out of phase. The difference between those two fluxes is illustrated about the zero line in FIG. 5.

The upward signals from sensor $S_1$ at phase angle 0 is directed to differential amplifier 51. The output from sensor $S_2$ at phase 90° offset is directed to differential amplifier 52. The output of the differential amplifier 51 is a sine wave 53 and the output from differential amplifier 52 is the cosine wave 54. These waves are directed to a comparator 55 which outputs pulses 56 and 57 respectively. The pulses 57 are in quadrature relation to the pulses 56. These pulses 56 and 57 are directed to a counter 58 which then produces an output count 59. The output counts are compared to an input count to the forcer 11. If there is a difference the forcer 11 is out of synchronization. In such a situation the motor can either be stopped or a correcting signal can be provided through a feedback mechanism.

Figure 8A:
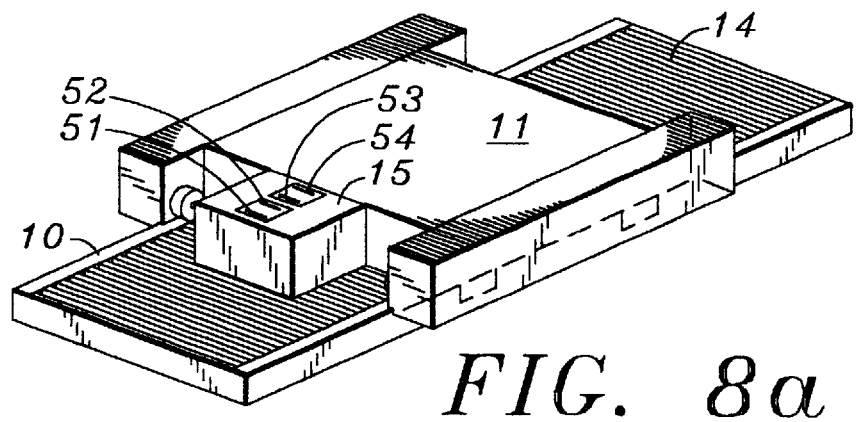
FIG. 8a is a representation of a single axis motor with the sensors mounted in a first relationship adjacent to the forcer.
Figure 8B:
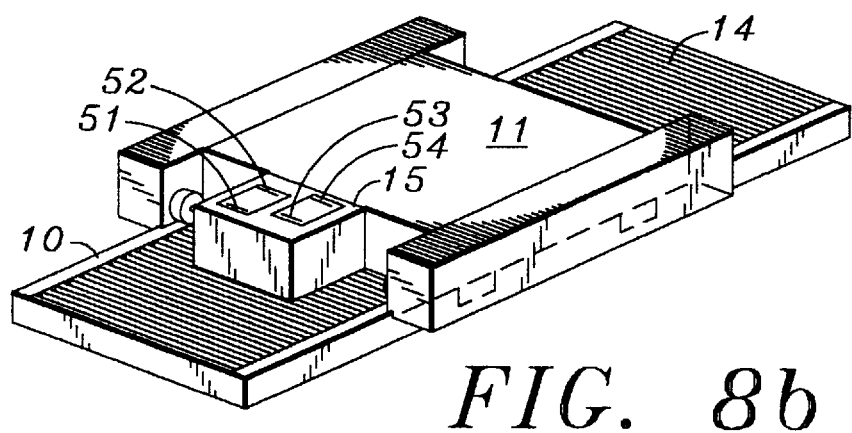
FIG. 8b is a representation of a linear motor with sensors mounted in a second relationship with the forcer.

As illustrated in FIGS. 8a and 8b there are two sets of sensors in different adjacent relationships. This is further illustrated in FIG. 2. As illustrated in FIG. 8a, there are sensors $S_1$ and $S_2$ in adjacent relationship as part of the first Hall effect sensing arrangement. Between the sensors $S_1$, and $S_2$ there is a Permanent Magnet arrangement. There is also adjacently located a second sensor arrangement $S_3$ and $S_4$ between which there is another Permanent Magnet relationship. These two magnetic relationships are 90° out of phase. As illustrated in FIG. 8b the relationship is one where the two pairs of sensors are offset from each other rather than in adjacent relationship. The arrangement of sensors $S_1$ and $S_2$ and sensors $S_3$ and $S_4$ can also be established as a 90° offset.

After each move, a controller compares the signal output from the sensor to the commanded move signal from the driver. If there is no difference, it is assumed that the forcer has successfully completed its move. The running summation with an up/down counter so as to arrive at a comparison point is operated in a manner as selected by the user. This can be after a single move by the forcer and sensor or after multiple moves by the forcer and sensor.

The system can operate in a situation where there is a comparison between command count and actual steps to be made after a length of unidirectional movement. Further this system also operates where the systems actually operate intermittently and bi-directionally, and may use the slewing mode.

The actual net count of steps can be compared to the net command. If the stepper system is not operating correctly then reference points have been lost and the user should need to shut down the unit until it has been checked so that a worthless workpiece or part associated with the forcer location is not produced.

A user further has the option as to how the signals that are derived are to be utilized. Thus there are situations where a signal can be activated to alert operator of a problem. The system can then be shut down. In an alternative manner the position can be corrected by moving the forcer to bring the error signal to zero.

If, when the machine has come to rest, the stepper motor has not taken the proper number of steps, then the error signal is indicated and the unit can be shut down. This can also operate with an indicator such as a display, ring a bell or simply a shut off the power.

Forcing the stepper to the correct position is a further possibility. Since it is known that there is something wrong with the stepper, it is usually regarded as preferable simply to wait for maintenance.

The net command number from the controller is the difference between the starting point of a cycle and the end point of the cycle, which may be zero (if the tool or element is to be returned to the starting point). The controller commands are in the form of successive direction and step signal combinations.

An up/down counter receives pulses indicating steps actually taken and their direction. The up/down counter may be used with the circuit. Different waves of the quadrature system can be used to signal the counter. This can be a commercially available chip or component.

The circuitry and signaling starts with the sine waves and goes through the digitizing processing. Sine wave signals from differential amplifiers are combined to provide the sensor signals, along with their quadrature components. Applying these to the "comparator", which is a standard commercial chip provides the A and B signals and their complements $\overline{A}$ and $\overline{B}$. This generates the pulses for driving the up/down counter. The circuit shows the differential amplifiers and comparators (the amps).

Figure 3:
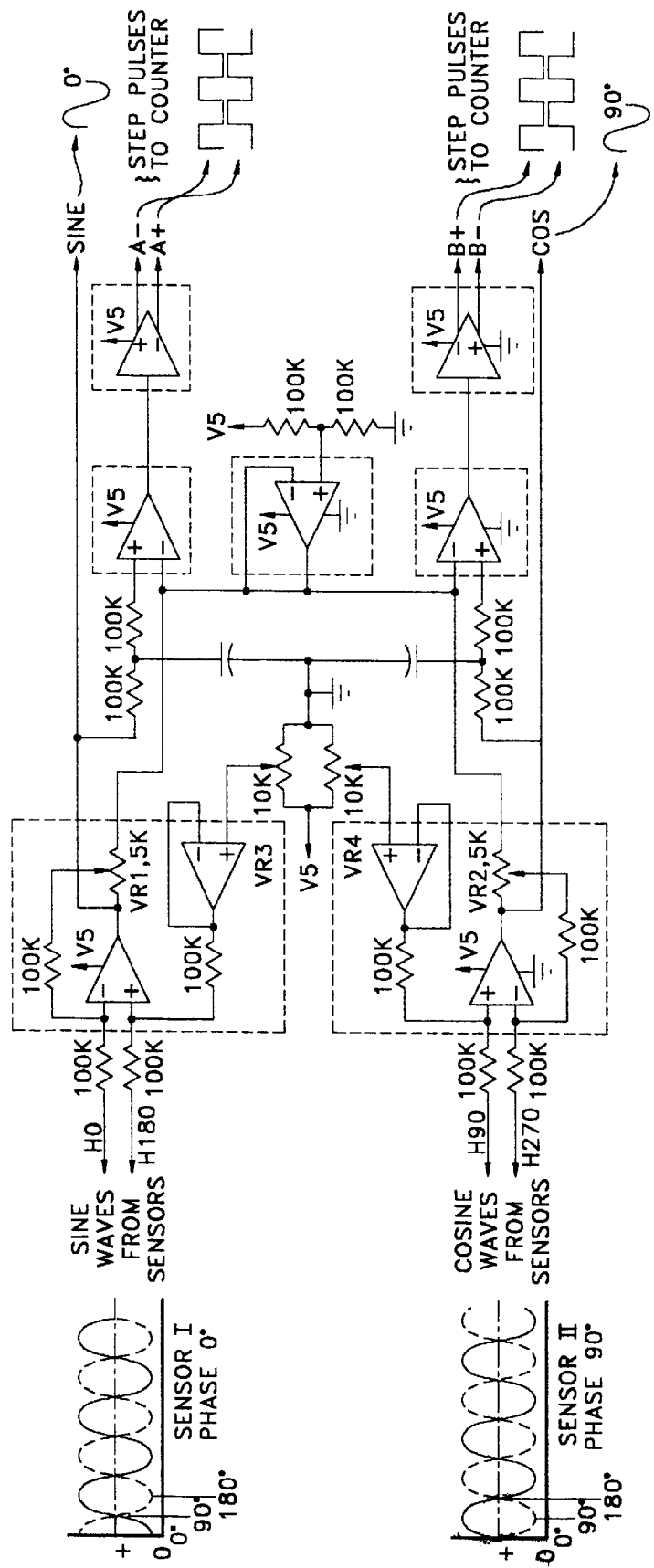
FIG. 3 is a diagram of the detailed electronic circuits.

A user may use the sine and cosine analog signals of FIG. 3 to generate pulse signals using zero crossing techniques or other means. For improved resolution, pulse signals which are interpolated between the zero crossing signals available from the sine and cosine signals, may be generated using known techniques.

It should be noted that the result of the digital comparison after stepping in any combination of forward and reverse sequences is a number. When the incrementor is driven in a slewing mode, the error can temporarily be greater than one. However, although the count may be 0, +1 or −1 when the rest position is reached, if it comes to rest at two or greater, there is definitely an error.

The periodic magnetic structure, sensors, and circuits may be arranged in a small package attached to the side of a primary or forcer and in magnetic relation to the secondary or platen, or alternatively is built into the linear motor configuration.

The system configuration can use any of a number of different routine outputs or connections. This device does not involve the simple one-step attachment of a sensor to a primary. The necessary voltage sources are connected, and there is some alignment, command signals provided and stored, and the comparison is used by the system.

Figure 7A:
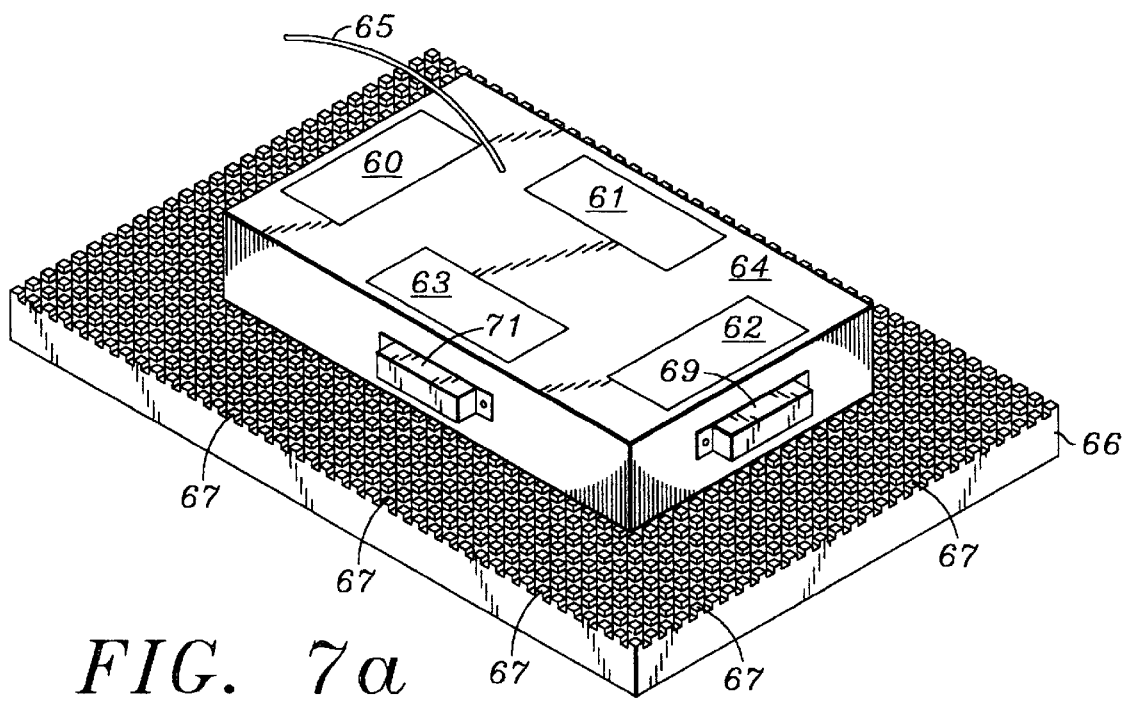
FIG. 7a is an illustration of the system in operation with four motors mounted in a shuttle moving over a waffle platen.

In FIG. 7a there is shown four motors 60, 61, 62 and 63 which are arranged in a shuttle element 64. Power to these motors is obtained through a power cord 65. The motors are arranged in the shuttle so as to effect movement over a waffle platen 66 which is essentially a waffle platen with a multiple teeth 67 arrangement on the base. The teeth are high density elements which are cut orthogonally with each other so as to form essentially teeth from left to right and bottom to top of the platen.

With the shuttle 64 there are sensors 69 and 71 which are two sensors mounted in a fixed relationship respectively with the motors against which they are adjacently located. Sensor 71 would operate with motors 61 and 63, sensor 69 would operate with motors 60 and 62. Each of these sensors can regulate the motors for each axis in a similar manner that the single axis motors has sensor 15 in relationship to the primary force 11. As the shuttle moves over the platen 66, the forcers of the respective motors 60, 61, 62 and 63 change in their relationship to the teeth 67 of the platen 66. The relationship of the sensors 69 and 71 also change in their relationship to the teeth 67 of the platen 66. Changes in the signals by the sensors can then be used in the same manner that the signals are used in describing the single phase motor moving over the secondary 10 in a single phase application. In this manner as the shuttle 64 moves in any direction over the platen 66 its position can be monitored so that if it goes out of position the system can be shut down. Alternatively, a rectifying signal can be sent to the motors to rectify the location of the shuttle as necessary. The shuttle is not limited to movement left or right or up and down, but, can move at any diagonal direction over the platen 66. That direction is the cumulative effect of movement in the left to right or up and down movement and appropriate signals are sent to the sensors 69 and 71 to regulate the movement.

Although the invention has been described largely in relation to a linear motor which has elements movable in an open loop manner, the invention is clearly applicable to other elements which may move in such an open loop manner.

Figure 7B:
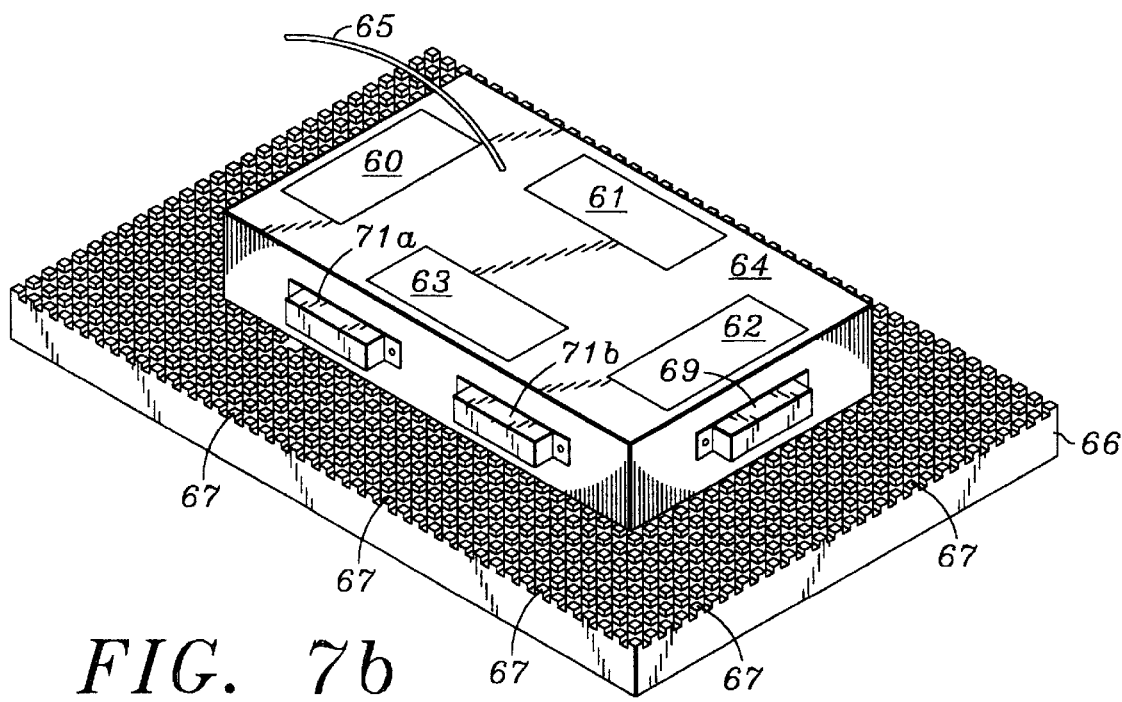
FIG. 7b is an illustration of the system in operation with four motors mounted in a shuttle moving over a waffle platen.

In another form of the invention as shown in FIG. 7b there is a configuration which is a variation of FIG. 7a. There are shown four motors 60, 61, 62 and 63 which are arranged in a shuttle element 64. Power to these motors is obtained through a power cord 65. The motors are arranged in the shuttle so as to effect movement over a waffle platen 66 which is essentially a waffle platen with a multiple teeth 67 arrangement on the base. There are sensors 69 and 71a and 71b which are s mounted in a fixed relationship respectively with the motors against which they are adjacently located. Sensor 71a would operate with motor 60, and sensor 71b would operate with motor 62. Sensor 69 would operate with motors 61 and 63. The sensors 71a and 71b can regulate the motors to control any angular movement which might tend to occur about the each axis. The two sensors 71a and 71b would be able to react with respective motors to provide a feedback signal to operate the requisite motor to counter any angular movement. This feedback would be in a similar manner that the single axis motor has sensor 15 in relationship to the primary force 11.

In other different embodiments the sensors 69, 71a and 71b can be arranged to operate any one or more of the motors 60, 61, 62 and 63, according to the desired operational characteristics of the shuttle 64.

As the shuttle moves over the platen 66, the forcers of the respective motors 60, 61, 62 and 63 change in their relationship to the teeth 67 of the platen 66. Changes in the signals by the sensors can be used in the same manner that the signals are used in describing the single phase motor moving over the secondary 10 in a single phase application. In this manner as the shuttle 64 moves in any direction over the platen 66 its position can be monitored so that if it goes out of position, linearly or angularly, the system can be shut down. Alternatively, a rectifying signal can be sent to the motors to rectify the linear or angular location of the shuttle as necessary.

The shuttle in FIG. 7b is not limited to movement left or right or up and down, but, can move at any diagonal direction over the platen 66. The diagonal movement is different to relative angular or rotational movement of the shuttle about its own axis.

Many other forms of the invention exist each differing from the other in matters of detail only. The scope of the invention is to be determined in terms of the following claims.

We claim:

1. A system for detecting movement of a forcer of a linear stepper motor comprising:

a linear stepper motor directed for effecting movement of a forcer in a first direction in response to command pulses, the motor including magnetic means;

a toothed platen for locating the forcer so that the forcer is movable over the platen;

an independent magnetic structure attached to move with the forcer and in magnetic interchange relation to the platen;

a magnetic circuit means associated with the magnetic structure including a respective flux sensor generating signal variations corresponding to magnetic flux variations as the forcer moves relative to the teeth of the platen;

permanent magnet means for the magnetic structure, the permanent magnet being separate from the magnetic means of the motor, and wherein the flux from the permanent magnet as sensed by a respective flux sensor varies as the relative movement between opposed teeth of sensor and platen changes; and means for processing the signal variations to provide step count signals.

2. A system as claimed in claim 1 wherein the magnetic circuit means includes teeth with a pitch matching teeth of the forcer.

3. A system as claimed in claim 1 including means for detecting the direction of movement of an open loop movable element and wherein the flux sensors include quadrature means for generating signals to indicate step movement and direction, and including means for comparing comprising an up/down counter.

4. A system as claimed in claim 1 wherein the sensor includes a unit for attachment to the forcer of the linear motor and for interaction magnetically with the platen.

5. A system for detecting movement of a forcer of a linear stepper motor comprising:

a linear stepper motor directed for effecting movement of a forcer in a first direction in response to command pulses, the motor including magnetic means;

a toothed platen for locating the forcer so that the forcer is movable over the platen;

an independent magnetic structure attached to move with the forcer and in magnetic interchange relation to the platen;

a magnetic circuit means associated with the magnetic structure including flux sensors generating signal variations corresponding to magnetic flux variations as the forcer moves relative to the teeth of the platen;

means for processing the signal variations to provide step count signals;

means for comparing the step count signals to the command pulses to detect a disparity; and including a permanent magnet for the independent magnetic structure, the permanent magnetic being separate from the motor magnetic means, and wherein the flux from the permanent magnet as sensed by the respective flux sensors varies as the relative movement between opposed teeth of sensor and platen changes.

6. A system as claimed in claim 5 wherein this variation is in sine-wave fashion.

7. A system as claimed in claim 1 wherein after each move of the motor and sensors, a controller compares the signal output from the sensor to the commanded move signal from the driver, and when there is no difference the forcer has completed a move in accordance with the commanded move signal, and when there is a difference between the signals then at least one of the following is effected a) a signal is activated; b) the system is shut down; or c) the position is corrected by moving the forcer to bring the difference signal to zero.

8. A system as claimed in claim 1 including multiple linear stepper motors mounted with a shuttle for moving the shuttle over the platen, the platen effectively having teeth in orthogonal directions thereby to form a waffle surface, and wherein each linear stepper motor includes a respective independent magnetic structure and magnetic circuit with a permanent magnetic separate from the magnetic structure of the motor, and wherein the processing means effectively processes the output signal thereby to regulate the movement of the shuttle over the platen.

9. A system of claim 1 wherein the toothed platen for the forcer is a toothed platen for the magnetic structure, there being no independent toothed platen or scale for the magnetic structure.

10. A system of claim 5 wherein the toothed platen for the forcer is a toothed platen for the magnetic structure, there being no independent toothed platen or scale for the magnetic structure.

11. A system of claim 10 wherein the toothed platen for the forcer is a toothed platen for the magnetic structure, there being no independent toothed platen or scale for the magnetic structure.

* * * * *